(No Model.)
J. C. BAUER.
PIPE VISE.
No. 328,102. Patented Oct. 13, 1885.
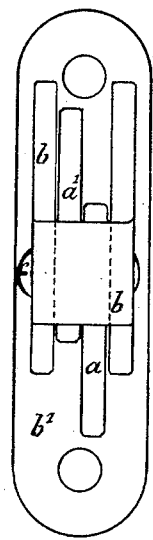
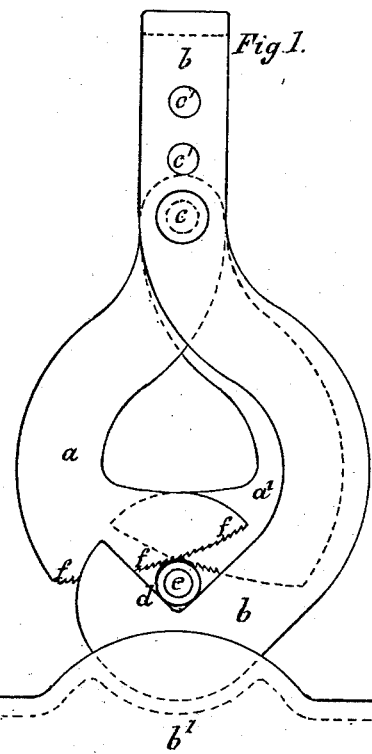
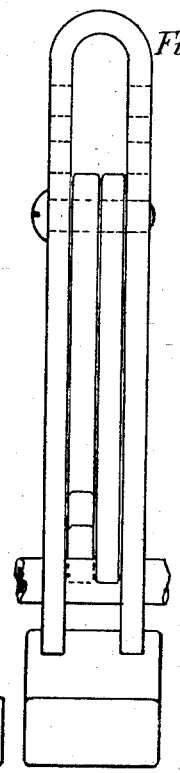
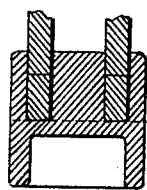
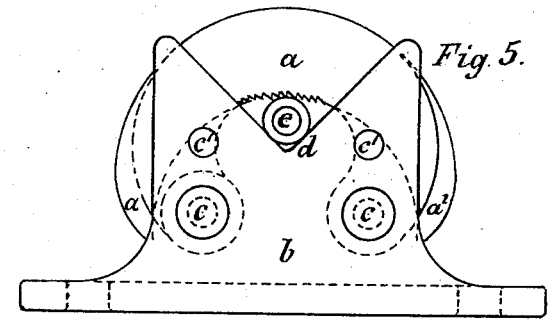
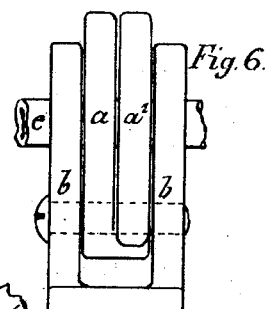
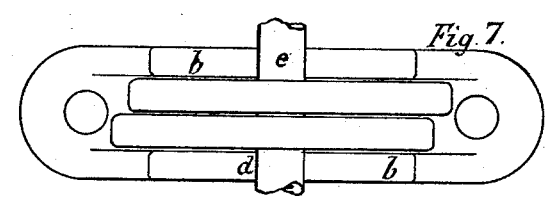
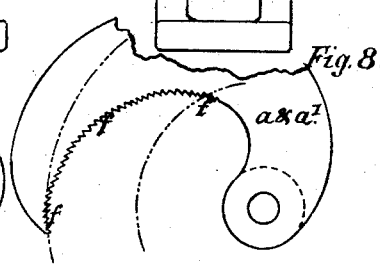
Witnesses
Percy White
F. L. Browne
Inventor
J. C. Bauer
by John J. Halsted & Son
his Attys.

UNITED STATES PATENT OFFICE.

JOHN C. BAUER, OF BROCKLEY, COUNTY OF KENT, ENGLAND.

PIPE-VISE.

SPECIFICATION forming part of Letters Patent No. 328,102, dated October 13, 1885.

Application filed March 31, 1885. Serial No. 160,820. (No model.) Patented in England August 9, 1884, No. 11,098; in Belgium October 7, 1884, No. 66,518; in France February 2, 1885, No. 166,764; in Germany February 5, 1885, No. 32,685, and in Austria-Hungary July 7, 1885, No. 9,901 and No. 34,658.

*To all whom it may concern:*

Be it known that I, JOHN CHARLES BAUER, a subject of the Queen of Great Britain, residing at Brockley, in the county of Kent, England, have invented new and useful Improvements in Pipe-Vises, (for which I have obtained Patents in Great Britain, No. 11,098, dated August 9, 1884, and in Belgium, No. 66,518, dated October 7, 1884,) of which the following is a specification.

In carrying out my invention I employ short pieces of steel (or iron) toothed at one end and pivoted at the other to a connecting body or link in such a manner that when the pipe or other article to be operated upon is placed between the toothed parts which form the vise-jaws and are opposite to one another, it is firmly held by them on account of the leverage brought to bear upon the pivot at the other end.

In order to enable my invention to be fully understood, I will proceed to describe the same by reference to the accompanying drawings, which represent views of pipe-vises constructed according to my invention.

Similar letters in all the figures represent similar parts.

In Figures 1, 2, and 3, $a$ and $a'$ are short pieces of steel or iron toothed at one end, as shown in the drawings, and pivoted at the other end, $c$, to the connecting body or link $b$, which is provided with an angular seating, $d$, for the pipe $e$ or other article to rest in. As the toothed parts of the aforesaid pieces of steel or movable jaws $a$ and $a'$ form an eccentric arc, $f$, so that the points of contact $f$ are of varying distance from the pivot $c$, it follows that the said movable jaws $a$ and $a'$ will, on being pushed aside, not only admit of pipes, &c., of various sizes being placed into the angular seating $d$, but will also securely hold such pipe or other article and prevent its turning one way or the other until released by simply pushing the said movable jaws again aside.

To admit of still larger pipes, &c., being placed into the vise, some extra holes $c'$ are provided to hold the pivot or pivots $c$ in a different position. The foot or base-plate $b'$ forming a part of the vise is to enable its being conveniently fixed to a work-bench. Fig. 4 represents a transverse section of the same.

Figs. 5, 6, and 7 represent a side elevation, an end elevation, and a plan of another shape of my pipe-vise, working on a similar principle to the one above described, but having the toothed part of the movable jaws on the inner side, as shown in Fig. 8, instead of externally, as shown in Fig. 1 of the accompanying drawings.

What I claim is—

A self-gripping pipe-vise, having one or more movable jaws pivoted to the body of the vise, and shaped at the opposite side to the pivot in such a manner that the distance from the said pivot to such opposite side or parts thereof increases or diminishes as the said jaw is being moved on its pivot one way or the other.

J. C. BAUER.

Witnesses:
   G. F. REDFERN,
   B. BRADY.